United States Patent [19]
Shiga et al.

[11] Patent Number: 5,257,554
[45] Date of Patent: Nov. 2, 1993

[54] DEVICE FOR ADJUSTING ECCENTRIC VALUE OF THE ECCENTRIC PORTION OF CRANK SHAFT IN PRESS MACHINE

[75] Inventors: Masakatsu Shiga, Tokyo; Noriyuki Shimizu; Naonori Taniguchi, both of Kanagawa, all of Japan

[73] Assignee: Aida Engineering, Ltd., Kanagawa, Japan

[21] Appl. No.: 857,421

[22] Filed: Mar. 26, 1992

[30] Foreign Application Priority Data

Mar. 26, 1991 [JP] Japan ................................. 3-87816

[51] Int. Cl.$^5$ ................................................. G05G 1/00
[52] U.S. Cl. ................................. 74/571 R; 74/571 L; 74/600; 74/55
[58] Field of Search ............... 74/571 L, 571 R, 600, 74/55

[56] References Cited

U.S. PATENT DOCUMENTS

| | | | |
|---|---|---|---|
| 1,516,993 | 11/1924 | Snyder | 74/600 |
| 1,563,669 | 12/1925 | Snyder | 74/600 |
| 1,733,162 | 10/1929 | Lubich | 74/571 L |
| 1,787,691 | 1/1931 | Lubich | 74/571 L |
| 1,977,924 | 10/1934 | Sünder | 74/571 L |
| 2,165,460 | 7/1939 | Desing | 74/522 X |
| 2,547,197 | 4/1951 | Conner | 74/571 M |
| 3,974,714 | 8/1976 | Fritsch | 74/571 L |
| 4,031,778 | 6/1977 | Fazekas | 74/571 L |
| 4,159,655 | 7/1979 | Johnson et al. | 74/571 L |
| 4,899,616 | 2/1990 | Kato | 74/571 L |
| 4,955,254 | 9/1990 | Kato | 74/571 L X |

FOREIGN PATENT DOCUMENTS 0322884 7/1989 European Pat. Off. .
63-6200 1/1988 Japan .

Primary Examiner—Leslie A. Braun
Assistant Examiner—Daniel Wittels
Attorney, Agent, or Firm—Lowe, Price, LeBlanc & Becker

[57] ABSTRACT

A device for adjusting eccentric value at an eccentric portion of crank shaft in press machine having: a main portion at the crank shaft rotatably supported by a frame; an eccentric portion having an axis eccentric from that of the main portion and adapted to be coupled into a connecting member of the press machine, the main portion and the eccentric portion being capable of leaving from each other along the axis of the crank shaft; connecting means provided at a connecting portion where the main portion and the eccentric portion contact with each other for connecting the main portion with the eccentric portion so that eccentric value of the eccentric portion from the main portion can be altered; and drive means for moving the connecting means.

8 Claims, 6 Drawing Sheets

DEVICE FOR ADJUSTING ECCENTRIC VALUE OF THE ECCENTRIC PORTION OF CRANK SHAFT IN PRESS MACHINE

BACKGROUND OF THE INVENTION

1. Field of the Invention

This invention relates to a device for adjusting eccentric value of a crank portion in a press machine.

2. Description of the Related Art

Devices for adjusting the eccentric value of a crank shaft to alter the slide stroke in a press machine are known. A conventional device of this type employs an eccentric sleeve.

A crank pin is utilized in eccentric portion eccentric from the rotating axis of a crank shaft, to which the eccentric sleeve is rotatably accompanied. One end portion of a connecting rod is rotatably coupled to the outer circumference of the eccentric sleeve. A fixing means for positioning the eccentric sleeve with reference to the crank pin is also provided. In this prior art structure, an adjustment of eccentric value of slide stroke, or the crank portion can be done by controlling a relative angle of the eccentric sleeve to the crank pin. The one end portion of the connecting rod eccentric from the rotating axis of the crank shaft via the crank pin and eccentric sleeve can alter its portion from rotating axis, so that adjustment of eccentric value can be performed.

It is known that Japanese Utility Model Application No. 63-6200 shows a device for adjusting eccentric value without rotating an eccentric sleeve (eccentric sheave). In this device, the sheave does not rotate and a straight angle rotation is done by a reciprocal shift of a lock pin between the eccentric sheave and the eccentric portion of the crank shaft.

However, the mentioned conventional eccentric value adjusting device making use of the rotatable eccentric sleeve should result in deviation of eccentric value and the properties of slide movement or the crank motion. This is because when the eccentric sleeve rotates in regard to the crank pin, the one end portion of the connecting rod does not only deviate from axis of the crank shaft to the eccentric direction of the crank pin, but another direction meeting at right angles thereto.

As mentioned above, when the crank motion undergoes changes, fine pressing cannot be expected and it should be influential in producing products.

While in the latter eccentric value adjusting device, it does not have changes of the crank motion but limits its adjustability in two-mode stroke, which is not useful.

It is generally known that if the crank shaft has a balance weight, an eccentric value adjustment in a press machine needs another adjustment where an eccentric connecting portion of the balance weight. However, no effective eccentric value adjusting device for the eccentric portion of the balance weight is proposed, so that an applicable eccentric value adjusting device to the balance weight is expected to be provided in the market.

An object of the present invention is to provide an eccentric value adjusting device for the eccentric portion of the crank shaft in a press machine, which should not badly influence the crank motion of the slide when adjusting the eccentric value of the crank portion of a press machine.

SUMMARY OF THE INVENTION

To attain this object, the present invention has a crank shaft in a state that a main portion and eccentric portion thereof are leavable. The connecting portion where the main portion and eccentric portion are contacting with and connecting with each other is provided with connecting means essentially having teeth portion so that the eccentric value of the eccentric portion is adjusted.

Particularly, the present invention is a device for adjusting eccentric value at an eccentric portion of crank shaft in press machine having: a main portion at the crank shaft rotatably supported by a frame; an eccentric portion having an axis eccentric from that of the main portion and adapted to be coupled into a connecting member of the press machine, the main portion and the eccentric portion being capable of leaving from each other along the axis of the crank shaft; connecting means provided at a connecting portion where the main portion and the eccentric portion contact with each other for connecting the main portion with the eccentric portion so that eccentric value of the eccentric portion from the main portion can be altered; and drive means for moving the connecting means.

According to the present invention, when adjusting eccentric value of the eccentric portion of crank shaft, the connecting means is firstly released by means of the drive means so that the eccentric portion of crank shaft is moved to the main portion. The slide or connecting rod is moved to the eccentric portion and alter the mutual positions of the main portion and the eccentric portion.

Subsequently, the connecting means is operated by the drive means to rotate the main portion and the eccentric portion of the crank shaft all together.

This means an eccentric rotation of the crank shaft. In this situation, if the connecting member is to be the connecting rod of slide, the eccentric portion shifted along the eccentric direction, so that no deviation of crank motion of the slide come into sight.

BRIEF DESCRIPTION OF THE DRAWINGS

FIG. 4 depicts the entire structure of a press machine 1 which comprises a bed 2 and a crown 4 support on columns 3. The bed 2 has thereon a bolster 5 opposing a slider 6 capable of reciprocal movement. On respective facing surfaces of the bolster 5 and slide 6 is a lower die 7 and a corresponding upper die 8. Between slide 6 and the column 3 is a slide fixing device 90.

Figure 1:
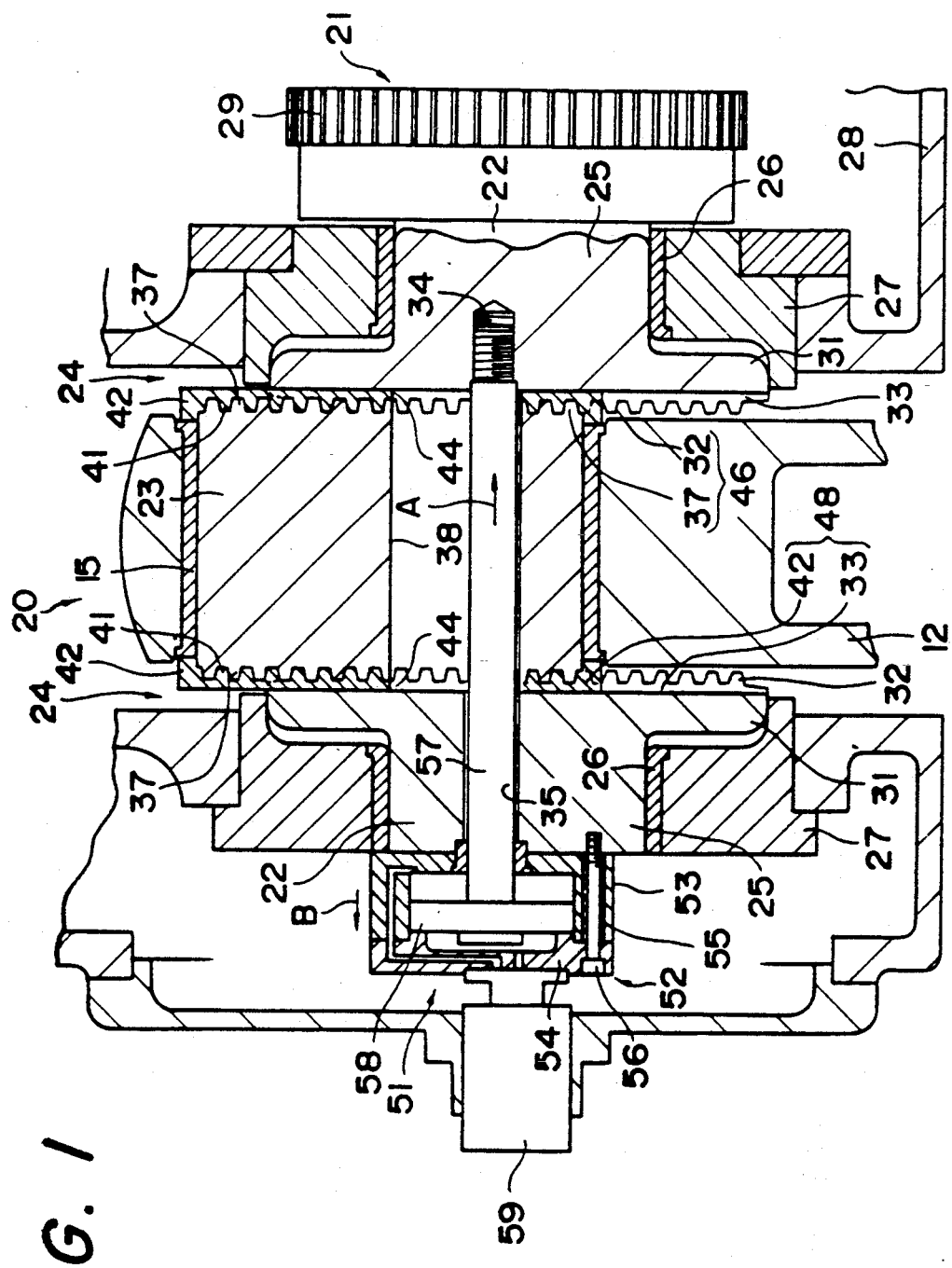
FIG. 1 is a sectional view of one embodiment of the eccentric value adjusting device according to the present invention.

The crown 4 has thereinside a crank shaft 21 provided with an eccentric value adjusting device 20 of the invention under the condition to rotate. The crank shaft 21 is rotatably connected with one end portion of a connecting rod 12, as a connecting member, via the eccentric value adjusting device 20. The other end portion of the connecting rod 12 is adapted to connect with the slide 6 via a slide adjusting device 13 comprising a screw and corresponding nut. Accordingly, an adjustment of the device 13 can control the length of the connecting rod 12, so that a so-called die height is finely controlled.

Figure 4:
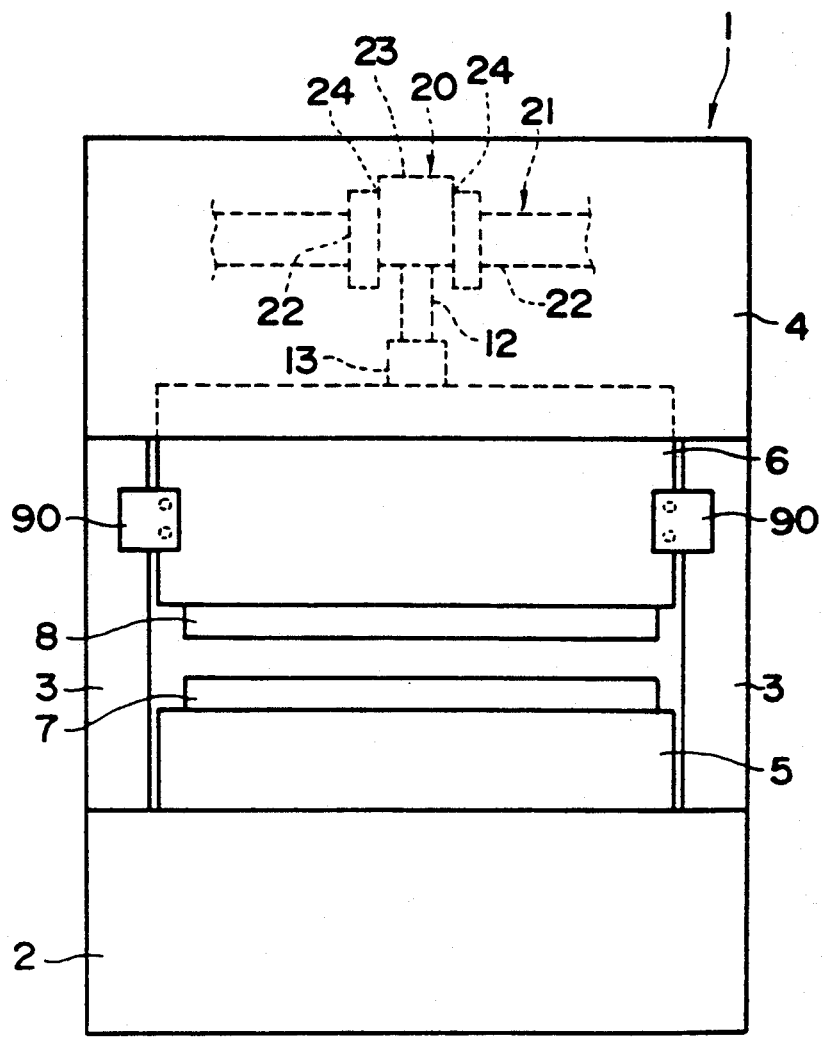
FIG. 4 is a front view of a general structure of the press machine employing the eccentric value adjusting device of the present invention.

The eccentric value adjusting device 20 will be explained in detail below. Generally, with reference to FIG. 4, an eccentric portion 23 is moveable in relation to a main portion 22 of the crank shaft 21 along the crankshaft axis. The objective adjustment of the eccentric value can be achieved by changing an engaging condition at a connecting portion 24 between the main portion 22 and the eccentric portion 23.

Figure 2:
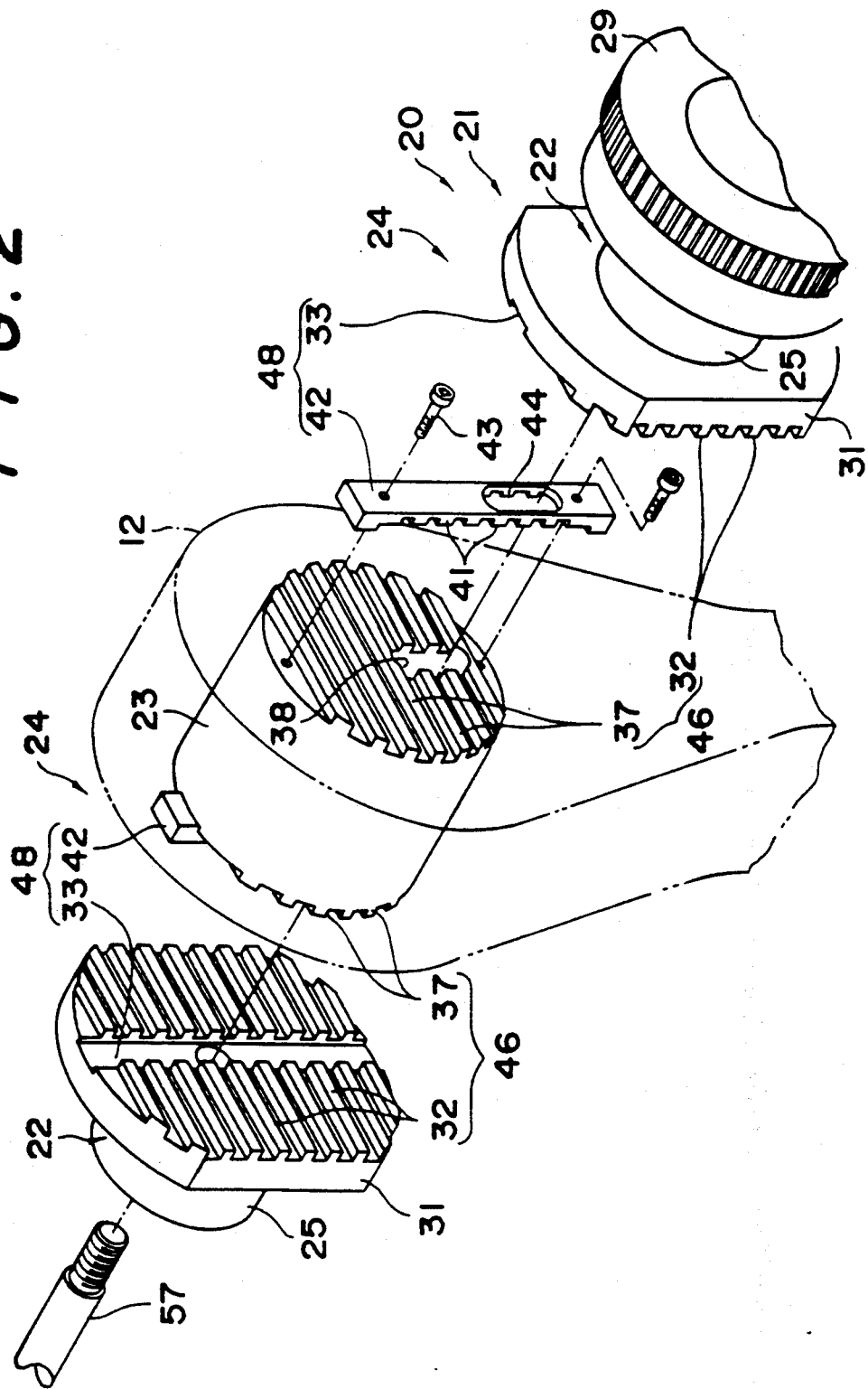
FIG. 2 is a fragmental perspective view of FIG. 1.

FIGS. 1 and 2 depict the eccentric value adjusting structure 20 in detail. Therein, the crank shaft 21 has a main portion 22 divided into two parts, an axial portion 25 of the main portion 22 is rotatably supported in a crown frame 28 by a metal bearing 26 and a bearing member 27 so that the crank shaft 21 rotates about the axis of the axial portion 25.

Figure 3:
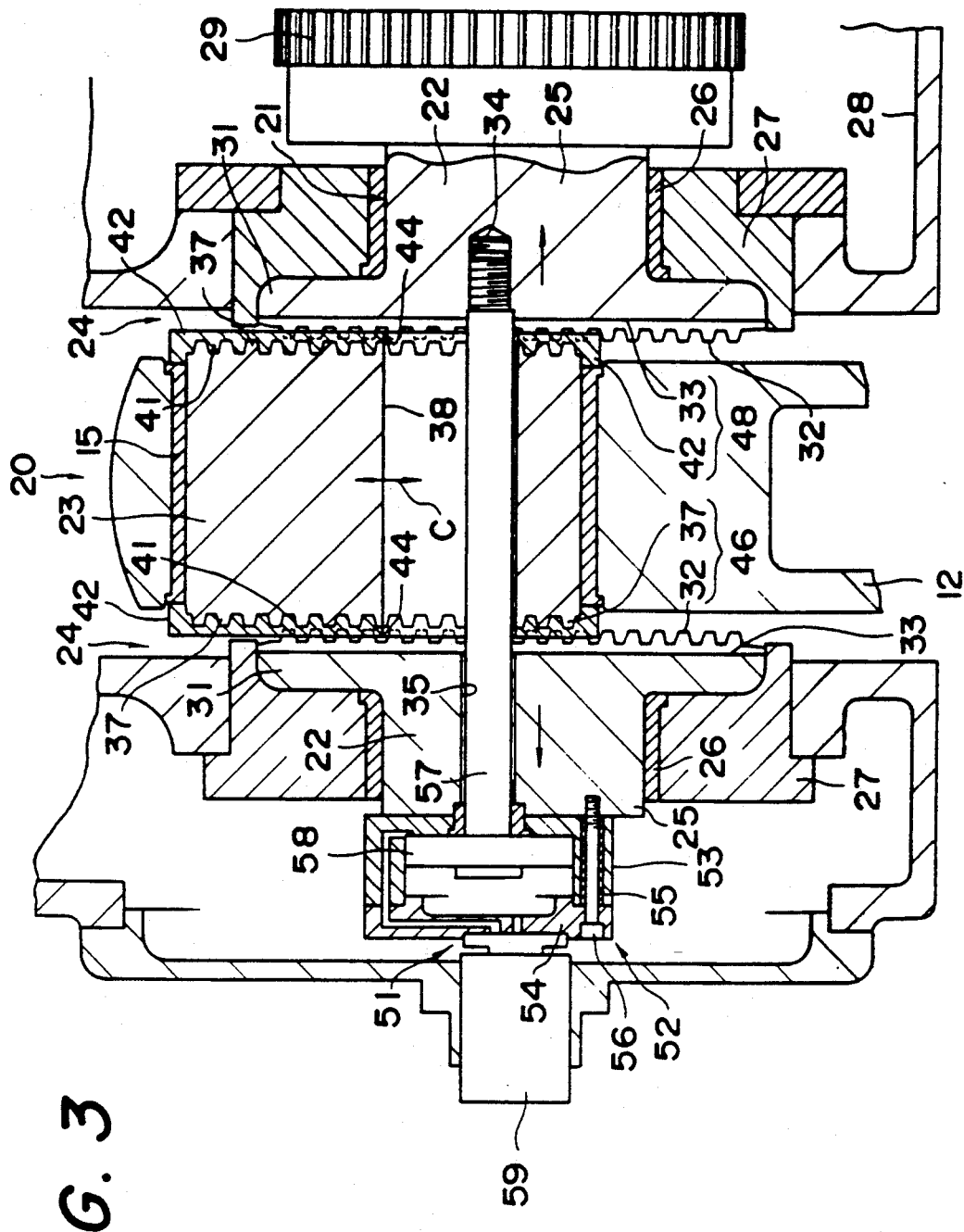
FIG. 3 is a sectional view of an operational state of FIG. 1.

An inner surface of the bearing member 27, and an opposing end surface of the flange 31 are arranged such that the inner surface 27 provides limited travel of the main portion 22 that is not connected to the drive gear 29, see FIGS. 1 and 3. Hence, when the eccentric portion 23 is separated from the main portion 22, the arrangement of the flange 31 and inner surface of the bearing member 27 establish a gap between the main portions 22 and the eccentric portion 23 such that the eccentric portion 23 remains generally vertically aligned and not tilted toward either of the main portions 22. By avoiding tilting of the eccentric portion 23, difficulty in re-engaging the main portions 22 with the eccentric portion 23 is avoided. The right side axial portion 25 of the main portion 22, shown in FIGS. 1 and 2, has a crank drive gear 29 to transmit power of a motor (not shown).

Each main portion 22 includes a flange portion 31 having parallel sides and a plurality of trapezoidal teeth 32 on entirely on one surface thereof. The teeth 32 are at right angles to the axis of the crank shaft 21 and parallel to the eccentric direction of the eccentric portion 23. The teeth 32 are also provided with a center key groove 33 extending a certain depth perpendicular to the extending direction of the teeth. The main portion 22 having the drive gear 29 is provided with a screw hole 34 at its eccentric portion, while, at the opposite portion in the other main portion 22, a through hole 35 is provided.

Between a pair of the main portions 22, or the teeth portions 32 on both flanges 31, there is the eccentric portion 23 under a condition so as to reciprocally move along the axis of rotation of the crank shaft 21. The eccentric portion 23 is formed into a cylindrical shape and has teeth portions 37 on its respective surfaces, corresponding to the teeth 32 on the main portions 22 so as to mesh with each other. The eccentric portion 23 has a through hole 38 in its inside portion eccentric from its center, or corresponding to the screw hole 34 and the hole 35. Each toothed surface of the eccentric portion 23 carries a key 42 having teeth 41, meshing with teeth 32, and secured to 23 with bolts 43. Each key 42 has a long hole 44 in alignment with the hole 38 in the eccentric portion 23.

According to the above, the teeth portions 32 of the main portions 22 and the teeth 37 of eccentric portion 23 can mesh with one another with the key groove 33 and the key 42 keyed to each other even if meshing of the teeth portions 32 and 37 are released.

In this disclosure, the portion between the main portion 22 and the eccentric portion 23, or the teeth portions 32 and 37, is the connecting portion 24.

In the followings, a device which is capable of adjusting the eccentric value of the eccentric portion 23 from the main portion 22 by means of the teeth portions 32, 37 and integrally rotate both of the portions 22 and 23, is termed a connecting device 46. Under the released condition of the teeth portions 32 and 37 of the connecting device 46, a device still guiding the eccentric portion 23 toward the eccentric direction with reference to the main portion 22 is termed a guide device 48.

That main portion 22 not having the drive gear 29 connects on the surface of its axial portion 25 with a cylinder 52 of a drive device 51 capable of engaging or releasing the connecting device 46. The cylinder 52 comprises a case 53 of which one end portion is opened, an end plate 54 corresponding to the opening of the case 53, some bushes, for examples, two bushes 55 going through the wall of the case 53, and two bolts 56 for fixing the end plate 54 to the main portion 22 through the bushes 55.

The cylinder 52 contains a piston 58 attached to one end of a reciprocal drive shaft 57. The other end of the drive shaft 57 connects through screw hole 34 to the other main portion 22 carrying drive gear 29. When moving the piston 58 of the cylinder 52, the main portion 22 on the case 53 is moved away from the opposite main portion 22. Hence, it follows that the engagement or release of the two teeth portions 32 and 37 is performed by operation of the cylinder 52.

The end plate 54 of the cylinder 52 has an opening 59 through which is fed a pressure fluid such as pressure oil. The drive device 51 should be structured with the cylinder 52, the reciprocal drive shaft 57 and the opening 59.

The operation of the above embodiment will now be explained.

First, crank shaft 21 is stopped when the slide 6 reaches at its upper limit. Eccentric portion 23 of the crank shaft 21 is shifted to its uppermost portion. After slide 6, stop slide fixing device 90 locks up the slide against the columns 3.

The drive device 51 of connecting device 46 is now operated so that the pair of main portions 22 separate from the eccentric portion 23, which is effected by the pressure oil fed into a space between the end plate 54 of the cylinder 52 and the piston 58 via the opening 59. Piston 58 is urged in the direction of arrow A in FIG. 1, while the case 53 fixed to the end plate 54 is moved in the arrow B direction. It follows that the main portion 22 having the case 53 is shifted in the B direction, causing teeth portions 32 and 37 of the main portion 22 and the eccentric portion 23 to be released. However, disengagement between the key 42 of the guide device 48 and the corresponding key groove 33 does not occur.

FIG. 3 depicts the disengaged state of the connecting device 46 after the pair of main portions 22 have shifted. As shown in FIG. 3, the length of the connecting rod 12 is adjusted by a predetermined length along the eccentric direction of the portion 23, or the arrow C direction by using the slide adjusting device. Next, the drive device 51 is operated to reconnect 22 with 23. This can be done by a feeding of the pressure oil into the space between the case 53 and piston 58 of the cylinder 52 via the opening 59. The piston 58 is then reversed, so that the reciprocal drive shaft 57 urges the main portion 22 and the case 53 toward the eccentric portion 23 and the case 53 and urges eccentric portion 23 to the other main portion 22. Hence, re-meshing of the teeth portions 32 and 37 of the main portion 22 and the eccentric portion 23 occurs, which reconnects portions 22 and 23.

In this way, the eccentric value adjustment at the eccentric portion 23 of the crank shaft 21 can be performed. However, the die-height of the press machine is changed. It is therefore necessary to adjust the slide adjusting device 13 to obtain a desirable die-height, by an engagement of the connecting device 46 conducted by the drive device 51 and by a release of the slide fixing device 90. The adjustment of the slide stroke can be completed as has been mentioned.

The mentioned embodiment has the following effects.

Since the eccentric portion 23 is so structured to reciprocally move with reference to the main portion 22 of the crank shaft 21 and to shift toward the eccentric direction of the portion 23, the adjustment of the eccentric value, or the slide stroke can be done without deviations of the crank motion, as opposed to the conventional eccentric sleeve.

The adjustment of the slide stroke can be easily operated by the drive device 51 of the connecting device 46 and the slide adjusting device 13. The connecting device 46 employs the teeth portions 32 and 37 being available to fully adjust the eccentric value of the portion 23 from the main portion 22, so that a fine adjustment of the eccentric value, or the slide stroke can be expected. The tightnesses of the connecting device 46 should be great because of many teeth of the portions 32, 37.

Since the main portion 22 and the eccentric portion 23 are guided by the key 42 and the key groove 33 of the guide device 48 to the eccentric direction, when the engagement of the connecting device 46 is released, any of other directional deviations will be regulated, so that re-engagement of the teeth portions 32, 37 of the connecting device 46 should be done smoothly.

The center axis of the drive device 51, or the reciprocal drive shaft 57 is eccentric from the axis of rotation of the crank shaft 21. The length of the holes 38 and 44 of the eccentric portion 23 and the key 42 are not necessary to be made big in order to obtain great eccentric value of the portion 23. The drive device 51 can balance a little with the weight of the slide 6.

Figure 5:
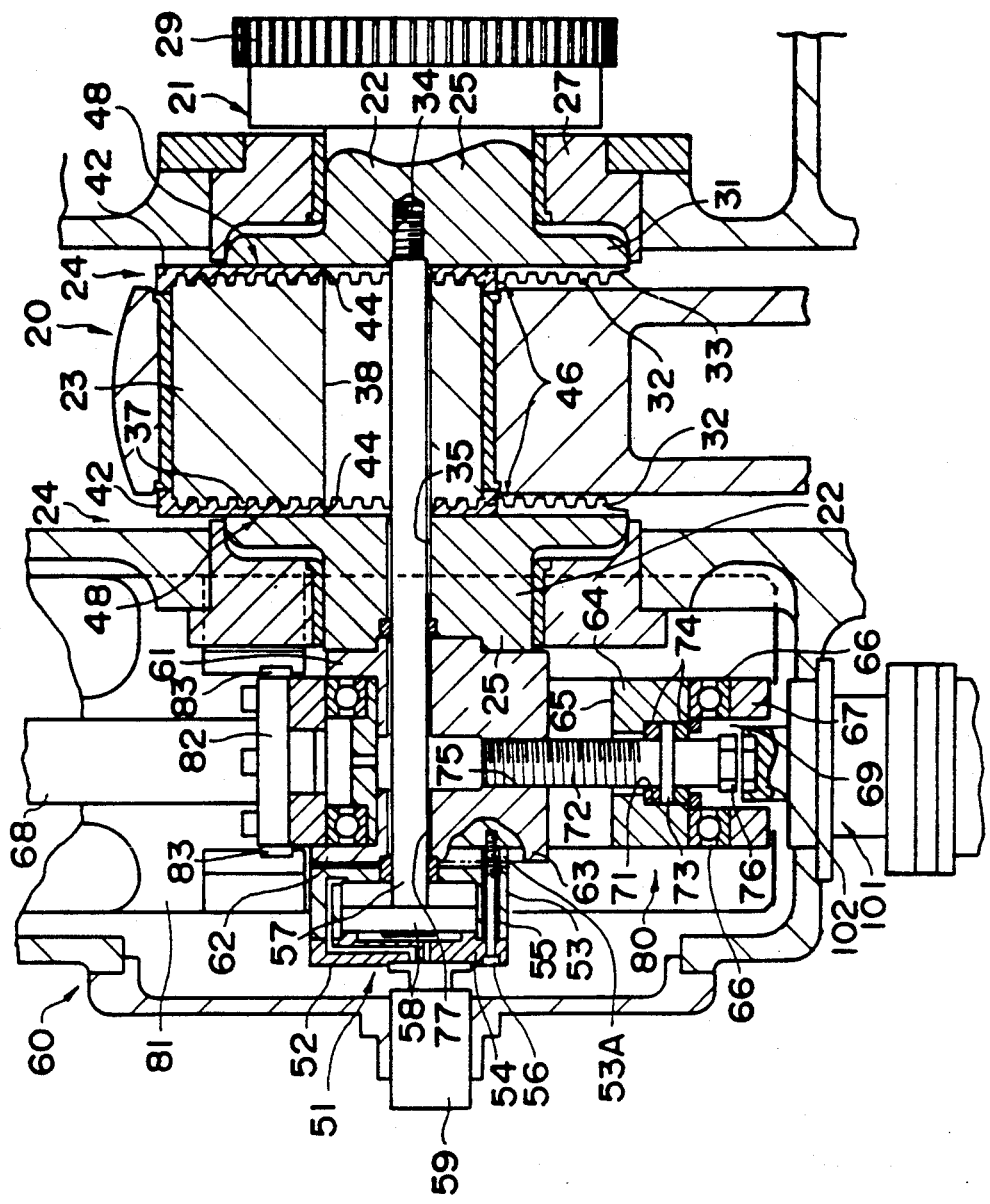
FIG. 5 is a sectional view of another embodiment of the present invention.
Figure 6:
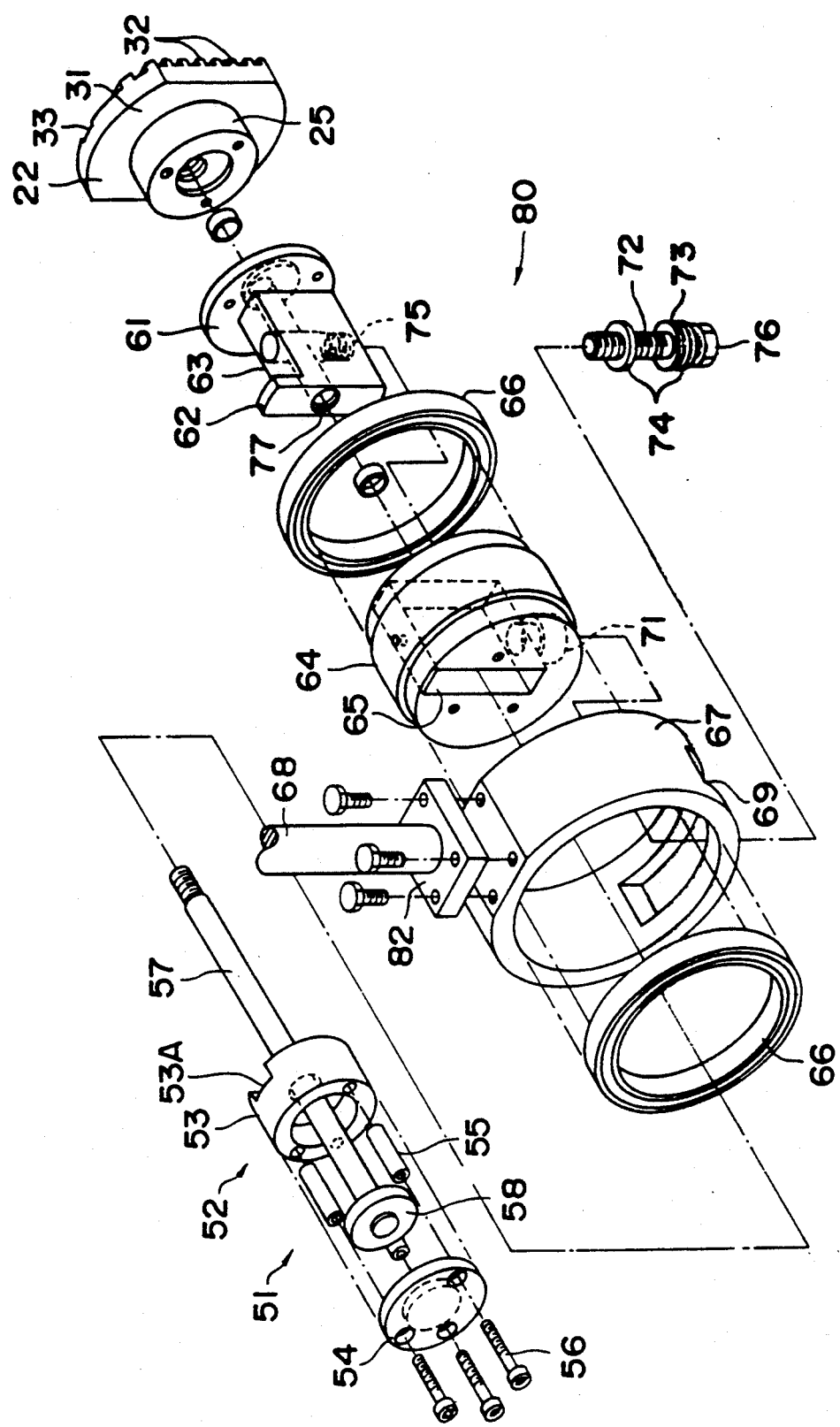
FIG. 6 is a fragmental perspective view of FIG. 5.

FIGS. 5 and 6 show another embodiment. This embodiment further employs a balance device 60 at the explained crank shaft 21 for balancing the weight of the slide 6. In the following, explanations for the same or similar structure with the mentioned embodiment will be omitted or explained simply with the same reference numerals.

As shown in FIGS. 5 and 6, the main portion 22 not having the drive gear 29 is accompanied with a guide element 63 which comprises a flange portion 61 and a square hanging portion 62 as opposed thereto. The guide element 63 is so disposed that the hanging portion 62 is projected from a square hole 65 of the moving element 64. The height of the square hole 65 is higher than the guide element 63, so that the moving element 64 can shift opposite to the eccentric portion 23 of the crank shaft 21.

The moving element 64 is accommodated inside of a sleeve member 67 via two ball-bearings 66 so as to rotate. The sleeve 67 has thereon a flange 82 for connecting with a connecting rod 68 as a connecting member for keeping a balance. In this way, the sleeve member 67 is of an end of the connecting rod 68.

At an opposite side of the sleeve member 67 to a portion where the connecting rod 68 is fit, there is a slot 69. At a corresponding position of the moving element 64 to the slot 69, a through hole 71 is provided, in which an adjusting screw 72 is kept by a pair of liners in a state not to move horizontally but rotate. The forwarded end portion of the adjusting screw 72 goes through the square hole 65 and reaches a screw hole 75 of the guide element 63. The reward end portion 76 of the adjusting screw 27 is connected with an adjusting screw driving device 101 mounted on the crown frame 28. The adjusting screw driving device 101 is so arranged as to reciprocally move toward the portion 76 of the adjusting screw 72 and has a screwdriver portion 102 driven by a not-shown motor. Accordingly, forwarding the screwdriver portion 102 to the adjusting screw 72 and driving the portion 102 along with the end portion 76, an amount of connection between the screw 72 and the guide element 63 is controlled.

At the end surface of the hanging portion 62, a drive device 51 for the mentioned connecting device 46 is provided. The drive device 51 has a cylinder 52 which comprises with the case 53, the end plate 54, the bushes 55, the bolts 56 and the reciprocal drive shaft 57 as in the above embodiment. In passing, the case 53 is fixed to the moving element 63 by means of the bolts 56.

The reciprocal drive shaft 57 of which one end has the piston 58 in the cylinder 52 extends through the hole 77 of the guide element 63, the hole 35 of the main portion 22 contacting with the guide element 63, and the holes 44, 38 of the key 42 and the eccentric portion 23 in this order, and is screwed up to the hole 34 of the main portion 22 having the drive gear 29. Consequently, when operating the drive device 51, the main portion 22 permanently contacting with the guide element 63 and the main portion 22 having the drive gear 29 leave from the eccentric portion 23, respectively. As has been mentioned, the engagement between the main portions 22 and the eccentric portion is released.

Incidentally, the cylinder 52 is connected with the opening 59 of the pressure fluid.

The other end portion of the connecting rod 68 has the balance weight 81 so as to rotate. The weight 81 is so provided as to horizontally move along a not-shown guide bar fixed to the crown frame 28, by which a weight balance of the moving slide 6 can be kept. At both sides of the flange 82 of the connecting portion for the sleeve member 67, or both sides along axis of the crank shaft 21, the guides 83 extended from the balance weight 81 are contacted respectively, so that the deviation of the connecting rod 68 along axis of the crank shaft 21 can be regulated.

In the foregoing, an eccentric value adjusting device 80 of the balance device 60 is constructed by the moving element 64 supported by the guide element 63, the adjusting screw 72 going into the moving element 64, the driving device 101 for the screw 72 and so on.

Next, the operation of the mentioned embodiment will hereunder be explained. An adjustment of the connecting rod 12 for the slide 6 is quite the same as in the prior embodiment, so that the explanation about it is omitted in the followings.

The preferred balance in the present invention should not be done only by the eccentric portion 23 but also by the balance weight 81 of the balance device 60. Accordingly, in this embodiment, when the slide stroke is adjusted, the eccentric value adjusting device 80 of the balance device 60 is also controlled for necessary eccentric value.

An adjustment of eccentric value in the balance device 60 is done by an operation of the driving device 101 in such a condition that the drive device 51 of the connecting device 46 is so operated that the engagement in the connecting device 46 is maintained. Operation of the driving device 101 is performed after operation of the slide adjusting device 13 such that the driving device 101 can control counter weight balance against the side after slide adjustment. As the subsequent step, the screwdriver portion 102 is closed to the adjusting screw 72 and connects to the portion 76 of the adjusting screw 72. Rotating the screwdriver portion 102 in a predetermined direction will serve as a rotation of the adjusting screw 72, so that the eccentric adjustment of the moving element 64 for the guide element 63.

The drive device 51 effects to the connecting device 46, or the main portion 22 having the driving gear 29 to shift rightwardly on FIG. 5 by means of the reciprocal drive shaft 57 with the piston 58, or the moving element 64 to shift leftwardly along with the guide element 63 via the moving element 64, so that the main portion 22 near the balance device 60 is moved leftwardly. This means that the moving element 64 can be moved into the eccentric direction for the hanging portion 62. The case 53 is attached to the hanging portion 62, whereby the moving element 64 and the guide element 63 are not fixed to each other but controlled by the screw 72 for eccentric value adjustment. It should be understood that operation of the drive device 51 translates the guide element 63 and associated components in the same direction as the main portion 22 adjacent the balanced device 60. The sleeve 67 and associated components are arranged to remain stationary.

The step follows up the above-mentioned adjustment with an interruption of the driving device 101 and a leaving of the screwdriver portion 102 from the portion 76 of the adjusting screw 72. When a pair of main portions 22 are shifted to the eccentric portion 23 by a reverse operating of the drive device 51, or by the case 53 of the cylinder 52 and the reciprocal drive device 57, the moving element 64 fixed on the case 53 of the cylinder 52 is so held against the flange portion 61 of the guide element 63 that an integration between the moving element 64 and the guide element 63 is achieved. The well-controlled eccentric value can be kept because of the integration.

After such adjustment in the balance device 60 in regard to the slide stroke, the standard operation of the press machine starts.

According to the mentioned embodiment, an ill-balance involved in an adjustment of the slide stroke is so cancelled by the eccentric value adjusting device 80 of the balance device 60 as to have a well balance in the press machine compared with a conventional one.

The adjustment in the eccentric value adjusting device 80 of the balance device 60 is simply performed only by rotating the adjusting screw 72, of which cost is not so expensive. Since the operation of the adjusting screw 72 is done automatically by the driving device 101, total operation for users should be fine.

As an engagement and release between the guide element 63 and the moving element 64 in the eccentric value adjusting device 80 of the balance device 60 are controlled by the drive device 51 when adjusting slide stroke of the slide 6, structure of the press machine can be simplified.

The embodiments in the present invention should not be limited in the mentioned embodiments. Other developments and modifications of the present invention may be included.

Taking for instance, a structure of the eccentric value adjusting device 20 employed in the slide 6 may be applied to the device 80 of the balance device 60. However, the device 80 of the balance device 60 having the adjusting screw 72 is more inexpensive than the device 20 having the teeth portions 32, 37. As the adjusting structure of the balance device 60 is not hard effected, the device 80 is pertinent.

In the arrangement of the eccentric value adjusting device 20, because the connecting device 46 is not necessarily to have the teeth portions 32, 27. Such an arrangement as a plurality of pins and corresponding holes may be applicable to it. An arrangement of the guide device 48 of the eccentric value adjusting device 20 may be in a state that the key 42 is provided to the flange portion 31 of the main portion 22 and the corresponding key groove 33 is done to the eccentric portion 23. The key 42 and key groove 33 are not restricted within the mentioned arrangements. Beyond this, other arrangements can be employed on condition that the mutual movement between the eccentric portion 23 and the main portion 22 are kept as mentioned before.

The drive device 51 for the connecting device 46 may be respectively provided for each main portion 22. The engagement and release of the guide element 63 and the moving element 64 in the balance device 60 shown in FIGS. 5 and 6 may be also conducted by two different drive devices. But from the economical and structural point of view the single drive device 51 is preferable.

The sleeve member 67 related with the moving element 64 of the balance device 60 via the bearings 66 is not necessarily to be connected with the balance weight 81 through the connecting rod 68 but connected therewith through another connecting member taught in Japanese Laid-Open No. 60-23160.

According to the above-explained invention, when adjusting eccentric value of the press machine, the crank motion of the slide is not affected.

What is claimed is:

1. A device for adjusting an eccentric value of an eccentric portion of a crank shaft in a press machine comprising:
    said crank shaft including a main portion rotatably supported in a frame of said press machine;
    said eccentric portion having an axis eccentric from that of said main portion and adapted to be coupled to a connecting member of the press machine, said main portion and said eccentric portion being capable of relative movement between each other along the axis of the crank shaft;
    connecting means, including a connecting portion formed separately from said main and eccentric portions and disposed within said eccentric portion and through which said main portion and said eccentric portion contact with each other connecting said main portion and said eccentric portion and being moveable to enable the eccentric value of said eccentric portion to be adjusted; and
    drive means for moving said connecting means to enable said relative movement to occur.

2. The device according to claim 1 wherein said connecting means includes teeth portions meshing with each other and guide means for adjusting the eccentric value between said main portion and said eccentric portion while maintaining engagement therebetween.

3. The device according to claim 2 wherein said guide means includes a key on one of said main portion or said eccentric portion and a corresponding key groove on the other of said main portion or said eccentric portion.

4. A device for adjusting an eccentric value of an eccentric portion of a crank shaft in a press machine comprising:

said crank shaft including a main portion rotatably supported in a frame of said press machine;

said eccentric portion having an axis eccentric from that of said main portion and adapted to be coupled to a connecting member of the press machine, said main portion and said eccentric portion being capable of relative movement between each other along the axis of the crank shaft;

connecting means, including a connecting portion where said main portion and said eccentric portion contact with each other for connecting said main portion and said eccentric portion and being moveable to enable the eccentric value of said eccentric portion to be adjusted; and drive means for moving said connecting means to enable said relative movement to occur, wherein said drive means has a cylinder, a reciprocal drive shaft of which one end has a piston capable of moving inside of said cylinder and of which the other end is fixed on said main portion through said eccentric portion, and an opening for feeding a pressure fluid to move said piston to cause said relative movement.

5. The device according to claim 4, wherein an axis of said reciprocal drive shaft is eccentric from the axis of the crank shaft.

6. A device for adjusting an eccentric value of an eccentric portion of a crank shaft in a press machine comprising:

said crank shaft including a main portion rotatably supported in a frame of said press machine;

said eccentric portion having an axis eccentric from that of said main portion and adapted to be coupled to a connecting member of the press machine, said main portion and said eccentric portion being capable of relative movement between each other along the axis of the crank shaft;

connecting means, including a connecting portion where said main portion and said eccentric portion contact with each other for connecting said main portion and said eccentric portion and being moveable to enable the eccentric value of said eccentric portion to be adjusted; and drive means for moving said connecting means to enable said relative movement to occur, further comprising a balance device between said connecting means and said drive means for adjusting the imbalance of a slide weight operatively connected to a slide connected to the crankshaft.

7. The device according to claim 6, wherein said balance device includes a balance weight moveable against the movement of the slide and an eccentric value adjusting device connected with said balance weight via the connecting member.

8. The device according to claim 7, wherein said eccentric value adjusting device includes a guide element, a moving element accompanied with said guide element, an adjusting screw in said moving element, and a driving device for said adjusting screw.

* * * * *